US006820699B1

United States Patent
Bettin

(10) Patent No.: US 6,820,699 B1
(45) Date of Patent: Nov. 23, 2004

(54) SYSTEM AND METHOD FOR CONTROLLING THE POSITIONS OF AN IMPLEMENT AND MARKERS ON A WORK VEHICLE

(75) Inventor: Leonard A. Bettin, LaGrange Park, IL (US)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 10/640,205

(22) Filed: Aug. 13, 2003

(51) Int. Cl.⁷ .............................................. A01B 17/00
(52) U.S. Cl. .......................................... 172/2; 172/127
(58) Field of Search ....................... 172/2–11, 126–132; 111/25, 33, 200; 56/10.2 R, 10.2 A–10.2 H; 701/50

(56) References Cited

U.S. PATENT DOCUMENTS

| | | | | |
|---|---|---|---|---|
| 5,320,186 A | * | 6/1994 | Strosser et al. | 172/8 |
| 5,333,533 A | * | 8/1994 | Hosseini | 91/361 |
| 5,339,936 A | * | 8/1994 | Lauer et al. | 192/53.332 |
| 5,810,095 A | * | 9/1998 | Orbach et al. | 172/2 |
| 5,833,010 A | * | 11/1998 | Scott et al. | 172/126 |
| 5,887,663 A | * | 3/1999 | Williams | 172/127 |
| 6,141,612 A | | 10/2000 | Flamme et al. | |
| 6,189,465 B1 | * | 2/2001 | Burns et al. | 111/33 |

* cited by examiner

Primary Examiner—Robert E Pezzuto
(74) Attorney, Agent, or Firm—Rebecca Henkel; Brant T. Maurer

(57) ABSTRACT

An apparatus and method for controlling positions of an implement and a marker associated with a work vehicle. The apparatus includes a hydraulic circuit coupled to a first cylinder that governs the position of the marker, a first valve coupled to a second cylinder that governs the position of the implement and also coupled to a first port of the circuit, and a second valve coupled to a second port of the circuit. The circuit is configured to isolate the first port of the circuit from secondary pressure supplied to the second port by way of the second valve, and further configured to isolate the primary port of the circuit from primary pressure supplied to the first port by way of the first valve. The primary pressure influences movement of both the marker and the implement, while the secondary pressure influences movement of the marker only.

20 Claims, 3 Drawing Sheets

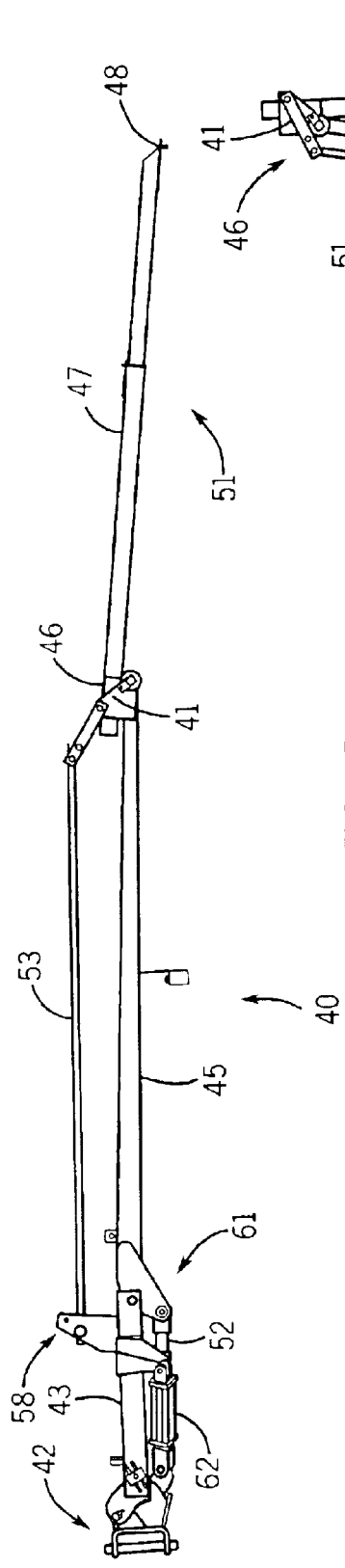
FIG. 2a
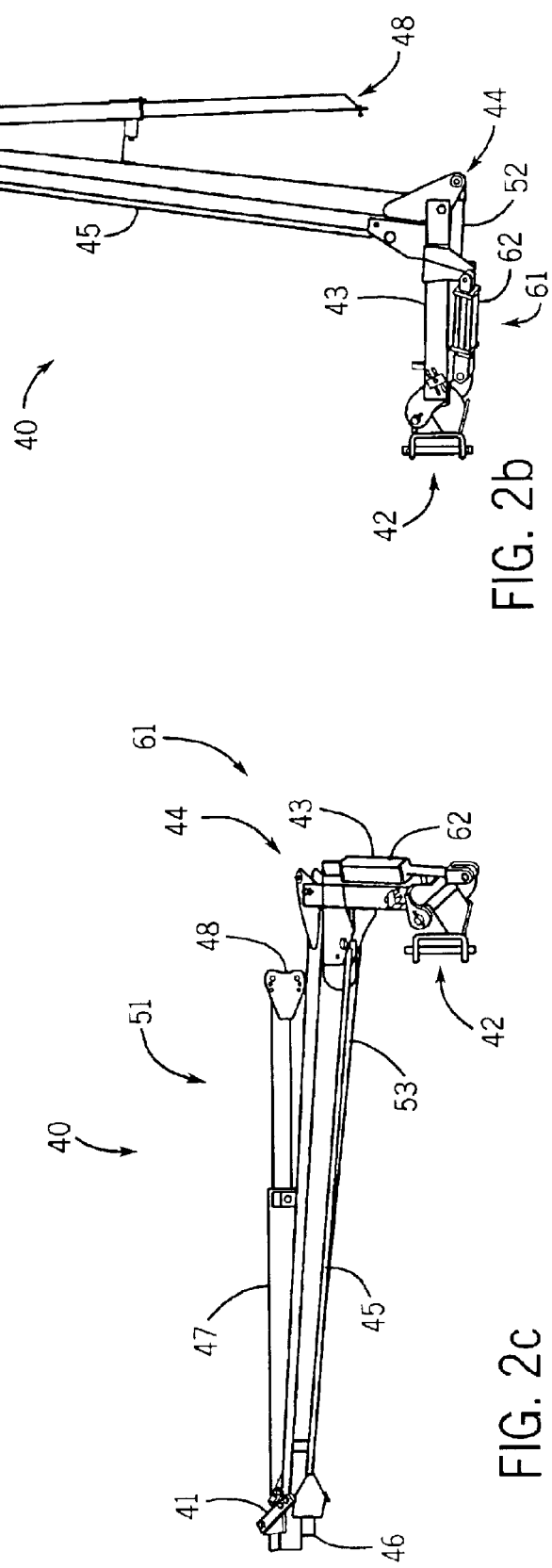
FIG. 2b
FIG. 2c

SYSTEM AND METHOD FOR CONTROLLING THE POSITIONS OF AN IMPLEMENT AND MARKERS ON A WORK VEHICLE

STATEMENT REGARDING FEDERALLY SPONSORED RESEARCH

Not applicable.

CROSS-REFERENCE TO RELATED APPLICATIONS

Not applicable.

FIELD OF THE INVENTION

The present invention relates to a system and method for controlling the position of an implement associated with a work vehicle (such as an agricultural work vehicle such as a tractor or a planter pulled by a tractor) and the position(s) of one or more markers attached to the implement. More particularly, the present invention relates to a system and method for controlling the positions of an implement and one or more markers by which it is possible to both provide coordinated positioning in which the markers and implement move together and independent positioning in which the markers and implement can be moved independently of one another.

BACKGROUND OF THE INVENTION

It is known for agricultural work vehicles, such as tractors or combines or other agricultural harvesting machines, to tow implements that perform (or include tool bar(s) that perform) one or more functions, such as plowing, planting or seeding, fertilizing, and harvesting in a field. Also, it is known for agricultural work vehicles to employ one, two or more markers that typically are extendable beyond the perimeter of the work vehicle and create markings by, for example, gouging furrows in the field adjacent to the vehicle. Such markers are typically attached to the implement towed by the work vehicle, although they may be attached to the work vehicle itself. Since an agricultural work vehicle typically traverses a field in a systematic row-by-row format, the markers often are used to create markings in the field to indicate to the operator of the vehicle a path for the next row. Markers are often, though not necessarily, installed in pairs on both sides of an agricultural work vehicle. Also, some agricultural work vehicles include more than one marker that can extend from a given side of the vehicle. For example, an agricultural work vehicle can include both inner and outer markers, where the outer markers are employed to provide markings at relatively larger distances from the work vehicle, and the inner markers are employed to provide markings at relatively smaller distances from the work vehicle.

With respect to most agricultural work vehicles, it is necessary for the work vehicles to have the capability of raising and lowering the implements (or tool bars of the implements) and markers with respect to the work vehicles and the ground. For example, a typical agricultural work vehicle proceeding through a field in a row-by-row manner must turn around at the end of each row in order to proceed down the successive row. While turning around, it is sometimes appropriate to raise the implement (or the tool bar of the implement) towed by the agricultural work vehicle some distance above the ground to prevent the implement from acting upon (or damaging) the ground or crops outside the lines of the rows. Similarly, it is common that the markers attached to an implement of a work vehicle be raised some distance above the ground while the work vehicle is turning around to prevent improper marking, damage to the ground or crops, or damage to the markers themselves that might occur if the markers encountered obstacles such as fences, trees, and boulders.

Often it is necessary not only that the markers themselves be raised but also that the implementation of the markers be changed while the work vehicle is turning around. For example, while it may be appropriate to utilize markers on both sides of a work vehicle as it first enters and makes its initial crossing of a field so as to create row markings on both sides of the work vehicle, implementation of markers on both sides of the work vehicle is no longer appropriate once it has completed its first row. Instead, it is then appropriate to utilize a marker only on one side of the work vehicle so that, as the vehicle proceeds down one of the two paths marked during its initial crossing of the field, a new row marking parallel to the previous row markings is created only in that section of the field that has not yet been traversed by the work vehicle. Insofar as a work vehicle needs to turn around regularly as it advances row-by-row through a field, it is appropriate to alternate the implementation of the markers used to create row markings so that new row markings are always created in that section of the field that has not yet been traversed by the work vehicle.

Because it is often appropriate for the markers and implement/tool bar of an agricultural work vehicle to raised and lowered at the same time, some conventional agricultural work vehicles actuate the raising and lowering of their markers and implements/tool bars using the same hydraulic valve. Such a single-valve system is simple and inexpensive to install on an agricultural work vehicle. However, in some agricultural work vehicles, it is desirable to have the capability of controlling the raising and lowering of markers independently of the raising and lowering of the implements/tool bars. For example, in the case of planters, it often is desirable to have the capability of raising and lowering markers, for reasons such as those discussed above (e.g., to avoid damage to the markers), without simultaneously raising and lowering the implements/tool bars of the planters, which would interrupt the planting operation. Some conventional planters, as well as other conventional agricultural work vehicles that need to provide such independent control of the markers and implements/tool bars, provide such independent control through the use of two (or more) different hydraulic valves for separately actuating the different devices.

Although such conventional systems employing multiple hydraulic valves allow for independent control of the markers and implements/tool bars, the systems can be difficult to manually operate. In particular, in situations where an operator desires coordinated movement of both the markers and implements/tool bar, the operator must manually actuate both (or all) of the hydraulic valves in order to obtain the desired functional adjustments. Such simultaneous actuation of multiple valves can require considerable attention and coordination on the part of the operator. Therefore, while the use of multiple hydraulic valves in a conventional agricultural work vehicle allows for independent control of the markers and implement/tool bar, it complicates achieving simultaneous movement of the markers and implement/tool bar that would otherwise be simple to achieve in agricultural work vehicles employing only a single hydraulic valve.

Accordingly, it would be advantageous if a new system and method were developed for implementation in an agricultural work vehicle that made it possible to control the positions of the vehicle's markers and implement/tool bar both simultaneously and independently of one another. In particular, it would be advantageous if, by way of such a new system and method, it was possible for an operator to achieve simultaneous raising and/or lowering of both the markers and the implement/tool bar of an agricultural work vehicle without having to simultaneously, manually actuate multiple different hydraulic valves, yet also possible to achieve independent control of the markers and implement/tool bar.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

SUMMARY OF THE INVENTION

In particular, the present invention relates to an apparatus for controlling positions of at least a portion of an implement and a first marker, both of which are associated with a work vehicle. The apparatus includes a hydraulic circuit coupled to a first cylinder that governs the position of the first marker, a first hydraulic valve coupled to a second cylinder that governs the position of the portion of the implement and also coupled to a first port of the hydraulic circuit, and a second hydraulic valve coupled to a second port of the hydraulic circuit. The hydraulic circuit is configured to isolate the first port of the hydraulic circuit from secondary hydraulic pressure supplied to the second port by way of the second hydraulic valve, and further configured to isolate the primary port of the hydraulic circuit from primary hydraulic pressure supplied to the first port by way of the first hydraulic valve. The primary hydraulic pressure is capable of producing changes in the positions of both the portion of the implement and the first marker in a coordinated manner, and the second hydraulic pressure is capable of producing changes in the position of the first marker independently of the position of the portion of the implement.

The present invention further relates to a work vehicle assembly that includes at least one marker that is capable of being raised and lowered at least in part by way of a first hydraulic cylinder, a component of the work vehicle assembly that is capable of being raised and lowered at least in part by way of a second hydraulic cylinder, and a hydraulic circuit having first and second ports and further coupled to the first hydraulic cylinder. The work vehicle assembly further includes a hydraulic fluid pressure source, a hydraulic fluid reservoir, and first and second control valves, each of which is coupled between a respective one of the first and second ports and both of the hydraulic fluid pressure source and the hydraulic fluid reservoir, where the first control valve additionally is coupled to the second hydraulic cylinder. The hydraulic circuit includes means for isolating the first port from secondary hydraulic pressure applied to the second port by way of the second control valve, and for isolating the second port from primary hydraulic pressure applied to the first port by way of the first control valve. Additionally, the primary hydraulic pressure communicated by way of the first control valve is capable of producing changes in the positions of both the first and second hydraulic cylinders, and the secondary hydraulic pressure communicated by way of the second control valve is capable of producing changes in the position of the first hydraulic cylinder but not the second hydraulic cylinder.

The present invention additionally relates to a method of controlling positions of at least one portion of an implement and at least one marker on a work vehicle assembly. The method includes providing primary hydraulic pressure by way of a first control valve to both a first cylinder and a first port of a hydraulic circuit that in turn is coupled to a second cylinder, where the first and second cylinders respectively govern the positions of the portion of the implement and the at least one marker, respectively, and where the providing of the primary hydraulic fluid adjusts the positions of both the portion of the implement and the at least one marker. The method further includes preventing the primary hydraulic pressure from being communicated, while it is being provided to the first port of the hydraulic circuit, to a second port of the hydraulic circuit, and providing secondary hydraulic pressure by way of a second control valve to the second port of the hydraulic circuit, where the providing of the secondary hydraulic pressure adjusts the position of the at least one marker. The method additionally includes preventing the secondary hydraulic pressure from being communicated, while it is being provided to the second port of the hydraulic circuit, to the first port of the hydraulic circuit.

BRIEF DESCRIPTION OF THE DRAWINGS

FIG. 2(a) is a fragmentary side elevation view of the right marker assembly shown in FIG. 1, where the marker assembly is shown with both the outer marker and inner marker in lowered positions;

FIG. 2(b) is a fragmentary side elevation view of the right marker assembly shown in FIG. 1, where the marker assembly is shown with the outer marker in a raised position and the inner marker in a lowered position;

FIG. 2(c) is a fragmentary side elevation view of the right marker assembly shown in FIG. 1, where the marker assembly is shown with each of the outer marker and inner marker in raised positions.

DESCRIPTION OF THE PREFERRED EMBODIMENT

The figures and corresponding text below describe several exemplary embodiments of the invention. However, it should be understood that the present disclosure is only exemplary of the invention and is not intended to be limiting and that the claims below should be referred to for a full understanding of the scope of the invention.

Figure 1:
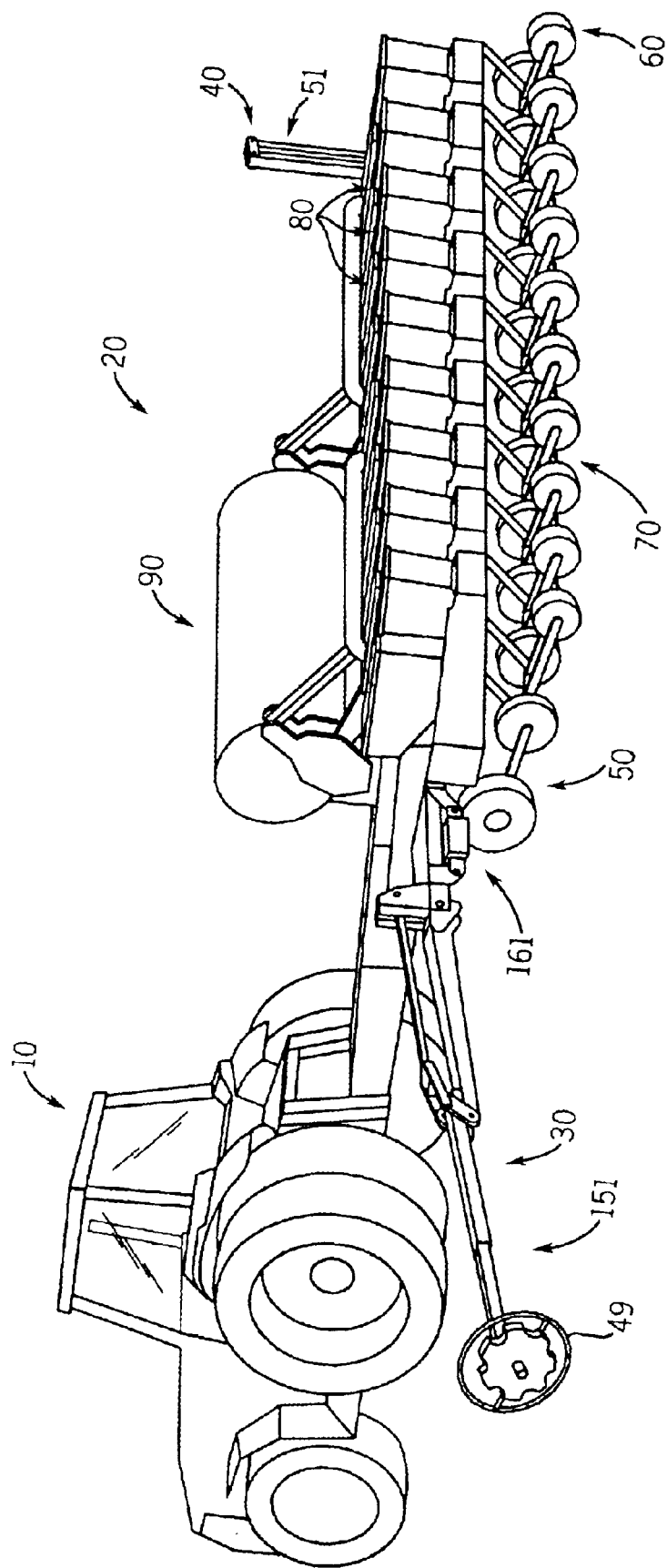
FIG. 1 is a perspective side elevation view of an exemplary agricultural work vehicle assembly that includes a tractor towing an implement having a tool bar and left and right marker assemblies including outer and inner markers.

Referring to FIG. 1, the present invention relates to work vehicles such as agricultural work vehicles that employ one or more markers that can be raised or lowered with respect to the ground and an additional implement (or toolbar of an implement) that also can be raised or lowered with respect to the ground. In the embodiment shown in FIG. 1, an exemplary work vehicle, in this case an agricultural work vehicle, is shown to be a tractor 10 that tows a planter 20. The tractor 10 can, for example, be a MX Series Magnum tractor manufactured by CNH Global NV of Racine, Wis., while the planter can be, for example, a Pivot-Transport planter also manufactured by CNH Global NV. As shown, the planter 20 towed behind the tractor 10 includes left and right marker assemblies 30, 40 that are attached to left and right sides 50, 60 of the planter respectively. Each of the left and right marker assemblies 30, 40 has outer and inner markers 151, 161, and 51, 61, respectively (see also FIG. 2). Additionally, the planter includes a toolbar 70 that is attached to the remainder of the planter 20 (the planter can also be termed an implement).

In accordance with the present invention, each of the markers 151, 161, 51 and 61 and the toolbar 70 can be raised and lowered with respect to the ground. In FIG. 1, the right outer marker 51 is shown to be in a raised position, while the left outer and inner markers 151, 161 are shown to be in lowered positions. In addition to the toolbar 70, the planter 20 additionally includes several other components that are known in the art, including a plurality of hoppers 80 and a liquid fertilizer tank 90. The toolbar 70 can include a variety of elements including, for example, seed discs, furrow opening and closing mechanisms, and press wheels, as are known in the art.

Although FIG. 1 shows the tractor 10 and planter 20, the present invention is intended to apply to any agricultural or other work vehicles that include one or more markers, as well as include a toolbar, implement or other device, where it is necessary to be able to raise and lower all of these devices. Although the planter 20 is shown to be towed by the tractor 10, the present invention also is intended to be applicable to any agricultural or other work vehicle on which one or more raisable/lowerable marker(s) and toolbar/implement are employed, regardless of whether all of these components are positioned on a single vehicle portion, or on multiple vehicle portions (e.g., where one marker is on the tractor, another marker is on a towed device other than the planter, and the toolbar/implement along with possibly yet another marker are on the planter itself.) The present invention further would relate to a work vehicle having only a single marker assembly, e.g., a right marker assembly, or having more than two marker assemblies, as well as to a vehicle on which one or more of the marker assemblies had only a single marker, or more than two markers.

Referring to FIGS. 2(a)–2(c), the right marker assembly 40 is shown in three positions, namely, a first position in which each of the right outer and inner markers 51, 61 is in its lowered position (FIG. 2(a)), a second position in which the outer marker is raised but the inner marker is lowered (FIG. 2(b)), and a third position in which each of the outer and inner markers is raised (FIG. 2(c)). As shown, the right marker assembly 40 includes a shoulder hinge 42 by which the marker assembly 40 is connected to the right side 60 of the planter 20. In addition to the shoulder hinge 42, the right marker assembly 40 includes an upper arm portion 43, an elbow hinge 44, a lower arm portion 45, a wrist hinge 46, and an outer extension 47, which are connected to one another in succession. The right outer marker 51 is formed primarily by elements 44–47 and is supported by the right inner marker 61, which is formed primarily by elements 42 and 43. Marking devices such as marking rings can be coupled to an outer tip 48 of the outer extension 47 and to an outer end 58 of the upper arm portion (see FIG. 1 for an exemplary marking ring 49).

The right inner marker 61 is actuated by a right inner marker cylinder 62 while the right outer marker 51 is actuated by a right outer marker cylinder 52 (see FIGS. 2(a) and 2(b)). As shown, when the outer marker cylinder 52 is expanded, this causes the lower arm portion 45 to raise. Because the outer extension 47 is hingedly connected to the lower arm portion 45 by the wrist hinge 46, the outer extension falls due to gravity as the lower arm portion 45 is raised such that the lower arm portion 45 and the outer extension 47 retract in upon one another as shown in FIG. 2(b). Conversely, when the right outer marker cylinder 52 is retracted, the lower arm portion 45 is lowered. Because a lever 41 attached to the outer extension 47 proximate the wrist hinge 46 is hingedly coupled to a pull 53 that in turn is coupled to the outer end 58, the outer extension 47 swings outward as the lower arm portion 45 is forced outward, and thus the right outer marker 51 becomes fully extended as shown in FIG. 2(a).

FIGS. 2(a) and 2(b) show the right inner marker 61 in its lowered position. That is, the right inner marker 61 can remain in its lowered position regardless of whether the right outer marker 51 is lowered or not. As shown in FIGS. 2(a) and 2(b), the right inner marker 61 is lowered when the right inner marker cylinder 62 is retracted. However, as shown in FIG. 2(c), when the right inner marker cylinder 62 is extended, the upper arm portion 43 becomes raised and the right inner marker 61 therefore is raised. As is evident from FIG. 2(c), when the right inner marker 61 is in its raised position, the right outer marker 51 must also be in its raised position. Although not shown in FIGS. 2(a)–2(c), the left marker assembly 30 in the present embodiment has a similar design to that of the right marker assembly and, in particular, the outer and inner markers 151, 161 of the left marker assembly are actuated by a left outer marker cylinder 152 and a left inner marker cylinder 52, respectively (see FIG. 3).

Figure 3:
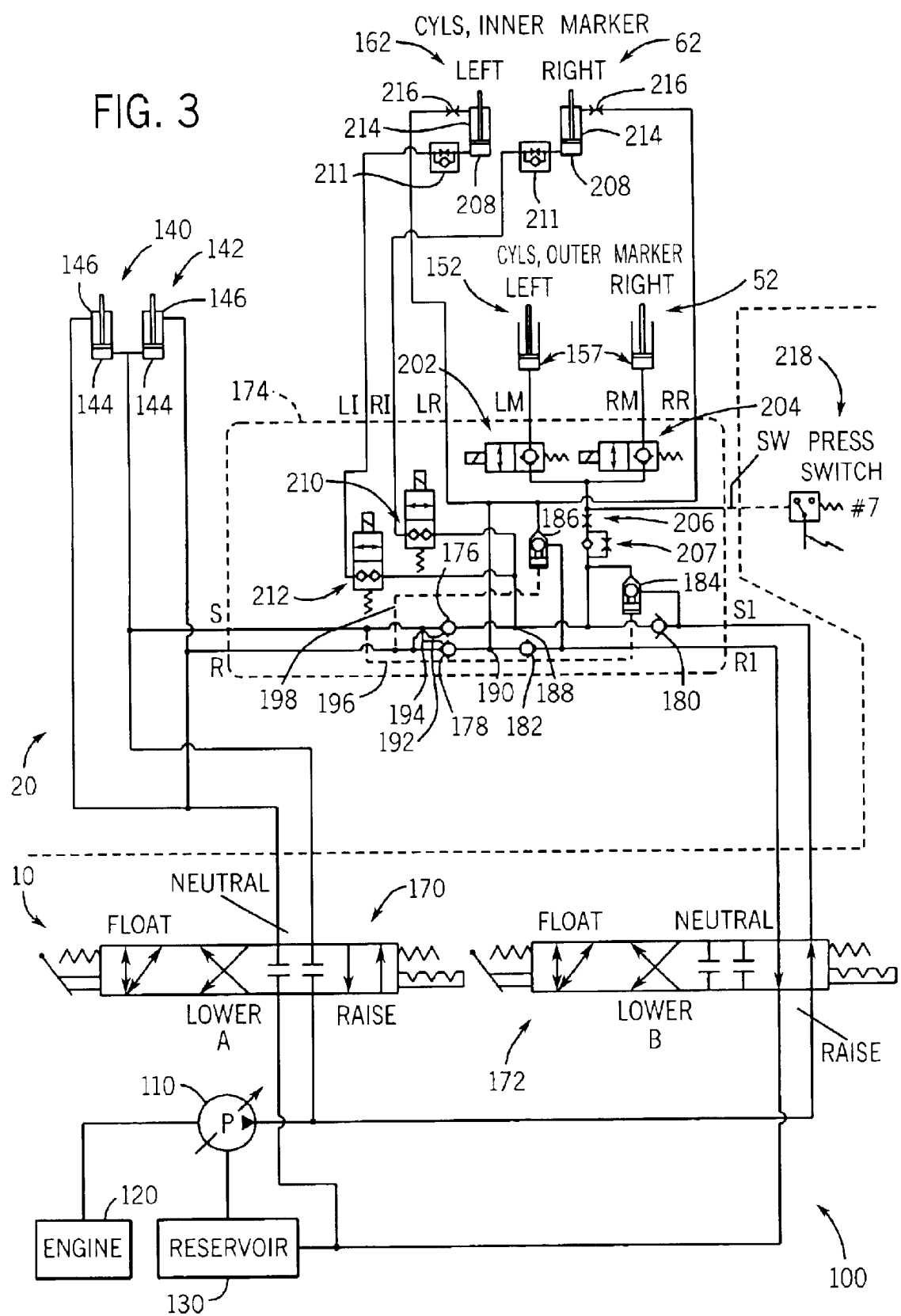
FIG. 3 is a schematic diagram of an exemplary hydraulic system for allowing both simultaneous and independent control of the markers of the right and left marker assemblies and the implement/tool bar of FIG. 1.

Referring to FIG. 3, components of a hydraulic system 100 capable of being implemented on the tractor 10 and the planter 20 to raise and lower the markers 51, 61, 151 and 161 and the toolbar 70 is shown. In particular, the hydraulic system 100 includes a pump 110 that is powered by an engine 120 of the tractor 10, and that is hydraulically coupled to a reservoir 130 from which it receives hydraulic fluid. The hydraulic fluid is then communicated to first and second toolbar cylinders 140, 142 that govern the raising and lowering of left and right halves of the toolbar 70, to the left and right outer marker cylinders 152 and 52, respectively, and to the left and right inner marker cylinders 162 and 62, respectively, by way of first and second control valves 170 and 172, and a control circuit 174. The right inner and outer marker cylinders 62, 52 are those discussed above with reference to FIGS. 2(a)–2(c) while the left inner and outer marker cylinders 162, 152, though not shown with reference to FIG. 1 or 2(a)–2(c), serve the same purposes with reference to the left marker assembly 30 as marker cylinders 62 and 52 serve with reference to the right marker assembly 40. In FIG. 3, the control valves 170, 172 are shown to be located on the tractor 10 so that the valves can be actuated by a tractor operator (e.g., using control levers within a cab of the tractor), while the control circuit 174 is shown to be located on the planter 20; however, the exact positioning of these components can vary depending upon the embodiment.

As shown, the first control valve 170 specifically governs the provision of hydraulic fluid and hydraulic fluid pressure to ports S and R of the control circuit 174, while the second control valve 172 specifically governs the provision of hydraulic fluid and hydraulic fluid pressure to ports S1 and R1 of the control circuit. Each of the first and second control valves 170, 172 has four possible positions or states, namely: a raise position in which hydraulic fluid is directed from the pump 110 to a respective one of the ports S, S1 and from the a respective one of the ports R, R1 to the reservoir 130; a lower position in which hydraulic fluid is directed from the pump 110 to a respective one of the ports R, R1 and from a respective one of the ports S, S1 back to the reservoir; a neutral position in which fluid flow between the corresponding ports S, R or S1, R1 and the pump and reservoir is precluded; and a float position in which both of the ports S, R or S1, R1 corresponding to the control valve are coupled to the reservoir 130. As shown, each of ports S, R, S1, and R1 is a port of the control circuit 174. In addition, the port S is coupled to head portions 144 of each of the toolbar cylinders 140 and 142, while the port R is coupled to rod portions 146 of each of those cylinders. Consequently, whenever the first control valve 170 is switched to the raise position, hydraulic fluid flow is provided to the head portions 144 of the cylinders 140, 142, which causes the cylinders to expand and thus raises the left and right halves of the toolbar 70. (In alternate embodiments, only one cylinder can be used to raise the toolbar 70 or a portion thereof or another movable element, or more than two cylinders can be used to raise more than two segments of the toolbar or other movable elements.) However, when the first control valve 170 is switched to the lower position, hydraulic fluid flow is directed to the rod portions of the cylinders 140, 142 and thus causes the toolbar 70 to be lowered. Further, when the first control valve is in the neutral position, hydraulic fluid flow cannot occur to or from the first and second toolbar cylinders 140, 142 from or to the pump or reservoir 110, 130, and consequently the position of the toolbar 70 is locked. Additionally, when the first control valve 170 is in the float position, the toolbar 70 can lower under the influence of gravity as fluid is passed from the head portions 144 of the toolbar cylinders 140, 142 to the rod portions 146 (because the rod portions are smaller in cross-section than the head portions due to the presence of the rods therewithin, some of the fluid leaving the head portions also is directed toward the reservoir 130).

The hydraulic fluid pressure provided to the ports S and R as determined by the first control valve 170, in addition to being provided to the cylinders 140 and 142, also is provided to the control circuit 174. Based upon the status of the control circuit 174, the hydraulic fluid pressure provided to the ports S and R additionally can determine the upward and downward positioning of the right and left outer and inner marker cylinders 52, 62, 152 and 162 which govern the positioning of the corresponding right and left outer and inner markers 51, 61, 151 and 161, respectively. Although, depending upon the status of the control circuit 174, the hydraulic fluid provided to the ports S and R can influence the positions of these marker cylinders 52, 62, 152, and 162, in accordance with the present embodiment of the invention, the hydraulic fluid provided to the ports S1 and R1 as determined by the control valve 172 also can influence the positions of these marker cylinders. That is, the actuation of the marker cylinders 52, 62, 152 and 162 and positioning of the markers 51, 61, 151 and 161 based upon the actuation of those cylinders can be governed either by way of the first control valve 170, in which case some or all of the marker cylinders can be actuated simultaneously with the actuation of the toolbar cylinders 140, 142, or by way of the second control valve 172, in which case some or all of the marker cylinders can be actuated independently of any actuation of the toolbar cylinders 140, 142. To prevent interaction between the hydraulic pressure provided by the two control valves 170, 172, the control circuit 174 serves to isolate the ports S1, R1 from hydraulic fluid pressure being provided at the ports S, R and serves to isolate the ports S, R from hydraulic fluid pressure being provided at the ports S1, R1.

As shown in FIG. 3, the control circuit 174 includes first and second pilot operated check valves 176, 178, first and second conventional check valves 180 and 182, and first and second pilot-to-close check valves 184 and 186. The first pilot operated check valve 176 is connected between the port S and a first intermediate node 188, while the second pilot operated check valve is connected between the port R and a second intermediate node 190. Further, the first conventional check valve 180 is coupled between the first intermediate node 188 and the port S1, while the second conventional check valve 182 is coupled between the second intermediate node 190 and the port R1. Except as discussed below with respect to check valves 176 and 178, each of the check valves 176, 178, 180, and 182 are configured and positioned so as to only allow hydraulic fluid to flow through each respective check valve toward its respective intermediate node, and not from its respective intermediate node back to the corresponding one of the ports S, R, S1 and R1. For example, the first conventional check valve 180 is configured and orientated to allow hydraulic fluid to flow from port S1 to the first intermediate node 188, but not in the opposite direction.

While the first and second conventional check valves 180, 182 are designed to always prevent hydraulic fluid from flowing from the intermediate nodes 188, 190 to ports S1 and R1, and to only allow hydraulic fluid to flow from the ports S1 and R1 to the intermediate nodes 188 and 190, respectively, the first and second pilot operated check valves 176 and 178, while normally being closed to prevent hydraulic fluid flow from the intermediate nodes 188, 190 to the ports S and R, can be operated in certain situations to allow hydraulic fluid to flow in that reverse direction. As shown, a first pilot line 192 is coupled between the first pilot operated check valve 176 and the port R, while a second pilot line 194 is coupled between the second pilot operated check valve 178 and the port S. Consequently, when hydraulic fluid pressure at the port S exceeds a certain minimum threshold, the second pilot operated check valve 178 enters an alternate state in which it allows hydraulic fluid to flow from the second intermediate node 190 to the port R. Similarly, when the hydraulic fluid pressure at the port R exceeds a certain minimum threshold, then the first pilot operated check valve 176 enters an alternate state in which it allows hydraulic fluid to flow from the first intermediate node 188 to the port S.

Further referring to FIG. 3, a third pilot line 196 couples the first pilot-to-close check valve 184 to the port S, while a fourth pilot line 198 couples the second pilot-to-close check valve 186 to the port R. The first pilot-to-close check valve 184 is coupled in parallel with the first conventional check valve 180 between the port S1 and the first intermediate node 188, and the second pilot-to-close check valve 186 is coupled in parallel with the second conventional check valve 182 between the second intermediate node 190 and the port R1. Each of the pilot-to-close check valves 184, 186 is designed to normally allow hydraulic fluid to flow in either direction between its respective port S1, R1 and its respective intermediate 188, 190. However, when hydraulic pressure at the port S exceeds a minimum threshold, the first pilot-to-close check valve 184 prevents hydraulic fluid from flowing from the first intermediate node 188 back to the port S1. Similarly, when the hydraulic fluid pressure at the port R exceeds a certain minimum threshold, then the second pilot-to-close check valve 186 prevents hydraulic fluid from flowing from the second intermediate node 190 back to the port R1.

Further as shown in FIG. 3, head portions 157 of each of the right and left outer marker cylinders 52, 152 are coupled to the first intermediate node 188 by respective right and left solenoid valves 202, 204 (which also are included as part of the control circuit 174 as shown in FIG. 3), and by a two-way restriction orifice 206 and a one-way restriction orifice 207. The restriction orifices 206, 207 are coupled in series with one another and the respective solenoid valves 202, 204 between the first intermediate node and the head portions of the respective cylinders 52, 152. Each of the solenoid valves 202, 204 can be set in one of two positions, a first position in which fluid flow is unrestricted by the solenoid valve and a second position in which fluid can only flow through the solenoid valve towards its respective marker cylinder and not away from its cylinder. The restriction orifices 206, 207 allow fluid flow both from the first intermediate node 188 to the solenoid valves 202, 204 and from the solenoid valves 202, 204 to the first intermediate node; however, the restriction orifices limit the rates at which fluid can flow. While the two-way restriction orifice 206 restricts flow in both directions, the one-way restriction orifice 207 serves only to restrict flow occurring toward the cylinders 52, 152.

Additionally as shown, respective head portions 208 of the respective right and left inner marker cylinders 62, 162 are coupled to the first intermediate node 188 by way of respective first and second solenoid valves 210, 212, each of which can be set in either a first position in which all fluid flow through the respective solenoid valve is prevented and a second position in which fluid flow through the respective solenoid valve is unrestricted. Although not required, in the embodiment shown, the respective solenoid valves 210, 212, are connected to the respective head portions 208 of the respective marker cylinders 62, 162 by respective one-way restriction orifices 211, which restrict fluid flow toward the head portions but not away from the head portions. Further, respective rod portions 214 of the right and left inner marker cylinders 62, 162 are coupled to the second intermediate node 190. In the present embodiment, these connections are made by way of respective two-way restriction orifices 216, although such orifices need not be employed in every embodiment.

Given the design of the control circuit 174, the inner and outer marker cylinders 62, 162, 52 and 152 can be actuated independently of the actuation of the toolbar cylinders 140, 142 if hydraulic fluid is applied at the ports S1 and R1 by way of the second control valve 172, and also can be activated simultaneously with the toolbar cylinders 140, 142 if hydraulic fluid pressure is applied at the ports S and R by way of the first control valve 170. In the case of simultaneous control, the first control valve 170 is adjusted to either the raise position or the lower position such that hydraulic fluid pressure from the pump 110 is communicated to the port S or to the port R, respectively. At such times, the second control valve 172 is typically in the float position, although this is not necessary. If the hydraulic fluid pressure is provided to the port S, the hydraulic fluid flows through the first pilot operated check valve 176 to the first intermediate node 188, and in turn is provided to each of the solenoid valves 210, 212, 202, and 204. Consequently, the head portions 157 of the right and left outer marker cylinders 52, 152 receive hydraulic fluid, which tends to raise the outer markers 51, 151 and, additionally, if the solenoid valves 210, 212 are in their second positions such that fluid is communicable therethrough, hydraulic fluid is then provided also to the head portions 208 of the respective right and left inner marker cylinders 62, 162, which causes the inner markers 61, 161 also to raise.

Further, as hydraulic fluid enters the head portions 208 of the inner marker cylinders 62, 162, hydraulic fluid must exit those cylinders from the rod portions 216, and fluid thus exiting the cylinders is returned to the second intermediate port 190. Because the hydraulic fluid pressure at the port S is at a high level, the second pilot line 194 communicates this pressure to the second pilot operated check valve 178, which causes that check valve to allow the fluid returning to the second intermediate port 190 to return to the reservoir 130 by way of the port R. Additionally, the third pilot line 196 communicates the pressure at the port S to the first pilot-to-close check valve 184, which causes that valve to close and thus prevent fluid from flowing from the first intermediate node 188 to the port S1. Also, because the hydraulic pressure applied to the port S is applied to the head portions 144 of the toolbar cylinders 140, 142, the toolbar 70 also tends to raise simultaneously as the markers are being raised.

Alternately, if the control valve 170 is put into the lower position such that the hydraulic fluid pressure from the pump 110 is applied to the port R, then hydraulic fluid flows through the first pilot operated check valve 178 to the second intermediate node 190. Because the pressure at the port R is communicated by way of the pilot line 192 to the first pilot operated check valve 176, that check valve allows hydraulic fluid to flow from the first intermediate node 188 to the port S and then further to the reservoir 130 by way of the first control valve 170. Consequently, fluid from the head portions 157 of the left and right outer marker cylinders 52, 152 can flow through the solenoid valves 202, 204 (assuming that those solenoid valves are in the first position allowing unrestricted flow therethrough) and further through the restriction orifices 206, 207 back to the first intermediate node 188 and finally to the reservoir 130 by way of the port S. The outer markers 51, 151 corresponding to the outer marker cylinders 52, 152 are lowered at a controlled pace (despite the fact that they are lowered under the force of gravity) due to the restriction created by the restriction orifice 206. If one or both of the solenoid valves 202, 204 are in their second position preventing flow away from the cylinders 52, 152, then the corresponding markers 51, 151 are locked in place and cannot lower. Also, fluid does not flow from the port R to the port R1 via the second pilot-to-close check valve 186 since the fourth pilot line 198 communicates the pressure of the port R to that check valve such that the valve precludes such flow.

Further, as fluid is provided to the second intermediate node 190 by way of the second pilot operated check valve 178, the fluid is further directed to the rod portions 216 of the inner marker cylinders 62, 162. If the solenoid valves 210 and 212 corresponding to the right and left inner marker cylinders 62, 162 are in their second, fluid-conducting positions, then hydraulic fluid is capable of leaving the head portions 208 of the cylinders and returning by way of the corresponding solenoid valves to the first intermediate node 188 and then, because the first pilot operated check valve 176 is open due to the pressure upon the first pilot line 192, further able to return to the reservoir 130 by way of the port S. If either of the solenoid valves 210, 212 happens to be in its first (closed) state, then the corresponding marker cylinder 62 or 162 cannot vary in its position. Additionally, as hydraulic fluid pressure is applied to the port R, then that fluid pressure is again provided to the rod ends 146 of the toolbar cylinders 140 and 142, and consequently the toolbar 70 lowers simultaneously with the lowering of the outer markers and/or inner markers as determined by the states of the solenoid valves 202, 204, 210 and 212.

In certain embodiments, including the one shown in FIG. 3, a switch 218 (actuatable by the operator or also by a computer) governs the positions of the solenoid valves 202, 204. In particular, the switch 218 allows an operator to alternate the solenoid valves' positions so that, at a first time, the solenoid valve 202 is in its first position such that it is fully conducting while the solenoid valve 204 is in its second position at a second time, the solenoid valve 204 is in its first position while the solenoid valve 202 is in its second position, and so on.

Regardless of whether the second control valve 172 is in the neutral state when hydraulic fluid is provided to one or the other of the ports S and R, the circuit 174 nonetheless prevents hydraulic fluid from being communicated to either of the ports S1 and R1. In particular, when the first control valve 170 is in the raise state such that hydraulic fluid pressure is provided to the port S, fluid nevertheless cannot be communicated from the first intermediate port 188 to the port S1 by way of the first conventional check valve 180, nor can hydraulic fluid be provided from that intermediate node to the port S1 by way of the first pilot-to-close check valve 184. Likewise, hydraulic fluid returning to the second intermediate node 190 cannot be provided to the port R1 by way of either the second conventional check valve 182 or the second pilot-to-close check valve 186. Likewise, when the first control valve 170 is in the lower position, such that hydraulic fluid pressure is provided to the port R, the conventional check valves 180, 182 and pilot-to-close check valves 184, 186 prevent fluid flow from the intermediate nodes 190, 188 toward the ports R1 and S1. Thus, the ports S1 and R1 are isolated from the hydraulic fluid pressure provided at either of the ports S and R.

In the case where the first control valve 170 is in the neutral position but the second control valve 172 is in the raise position or the lower position, the outer marker cylinders 52, 152 and inner marker cylinders 62, 162 can be actuated independently of (e.g., without the actuation of) the toolbar cylinders 140, 142. In particular, if the second control valve 172 is placed into the raise position, hydraulic fluid pressure is provided from the pump 110 to the port S1. The pressure at the port S1 is initially provided to the first intermediate node 188 by way of both the first conventional check valve 180 and the first pilot-to-close check valve 184. However, because the first conventional check valve 180 is spring-biased towards being closed, once some of the fluid initially moves from the port S1 to the first intermediate node 188, the first conventional check valve tends to close, thus preventing further fluid flow through that valve. Consequently, after initially flowing through both the first conventional check valve 180 and the first pilot-to-close check valve 184, the fluid then continues to flow from the port S1 to the first intermediate node 188 only by way of the first pilot-to-close check valve. Regardless of how the hydraulic fluid reaches the first intermediate port 188, that fluid then proceeds toward each of the solenoid valves 202, 204, 210 and 212 and is capable of actuating the outer and inner marker cylinders 52, 152, 62, and 162, depending upon the states of those solenoid valves. When the solenoid valves 210 and 212 are in their second, fluid-communicating positions, fluid further returns from the rod ends 216 of the inner marker cylinders 62, 162 to the second intermediate node 190 and further returns to the port R1 from that node by way of the second pilot-to-close check valve 186.

Alternately, when the second control valve 172 is in the lower position such that hydraulic fluid pressure is provided to the port R1, hydraulic fluid flows first to the second intermediate node 190 by way of both of the second conventional check valve 182 and the second pilot-to-close check valve 186, and then continues to flow to the second intermediate node by way of only the second pilot-to-close check valve. Depending upon whether the solenoid valves 210 and 212 are in the fluid communicating positions, hydraulic fluid may or may not flow toward the rod ends 216 of the inner marker cylinders 62, 162 and then return from the head ends 208 of those cylinders by way of the solenoid valves to the first intermediate node 188. Further, depending upon whether the solenoid valves 202 and 204 are in their fluid communicating positions, fluid also may return to the first intermediate node 188 by way of the respective solenoid valve(s) and the restriction orifices 206, 207. The fluid returning to the first intermediate node 188 then further can proceed out to the reservoir 130 by way of the port S1 by way of the first pilot-to-close check valve 184. Assuming that the first control valve 170 is either in the neutral position or the float position while all this is taking place, there is no significant hydraulic fluid pressure at the ports S and R, and consequently neither of the first and second pilot operated check valves 176, 178 are opened to allow fluid to flow from the intermediate nodes 188, 190 to the ports S and R. Thus, the actuation of the marker cylinders 52, 152, 62 and 162 can occur independently of (typically, without) any actuation of the toolbar cylinders 140, 142.

The control circuit 174 shown in FIG. 3 is only one embodiment of several possible embodiments envisioned by the present invention. The control circuit 174 shown in FIG. 3 employs three pairs of different types of check valves 176 and 178, 180 and 182, and 184 and 186 in order to allow for the outer markers 51, 151 to move up and down when in the lowered position to accommodate variation in the terrain encountered by the markers. That is, typically, when the inner and outer markers 51, 151, 61, 161 are in their lowered positions, the second control valve 172 is in the float position such that, as those markers need to vary in their position to account for variations in terrain, hydraulic fluid can freely flow back and forth to the marker cylinders 52, 152, 62 and 162 by way of the ports S1 and R1 and the pilot-to-close check valves 184 and 186. However, in alternate embodiments, for example, embodiments in which the marker linkages themselves include compensation features that effectively allow the markers to float without necessitating any movement of hydraulic fluid in relation to the movement of those markers, then the pilot-to-close check valves 184 and 186 can be eliminated and the first and second conventional check valves 180 and 182 can be replaced with pilot operated check valves like the check valves 176 and 178, with pilot lines coupling those respective new pilot operated check valves to the ports S1 and R1 (in alternating fashion, just as the pilot lines 192 and 194 couple the check valves 176 and 178 to the ports S and R.)

The present invention is also intended to encompass a variety of alternate embodiments that employ varying numbers and types of valves in place of or in addition to any of the valves 170, 172, 176, 178, 180, 182, 184, 186, 202, 204, 210 and 212, so long as there are two isolated hydraulic actuation paths in which one of the paths actuates one or more marker(s) while another of the paths actuates those marker(s) plus an additional component such as a toolbar.

To apprise the public of the scope of this invention, the following claims are made:

What is claimed is:

1. An apparatus for controlling positions of at least a portion of an implement and a first marker, both of which are associated with a work vehicle, the apparatus comprising:

a hydraulic circuit coupled to a first cylinder that governs the position of the first marker;

a first hydraulic valve coupled to a second cylinder that governs the position of the portion of the implement and also coupled to a first port of the hydraulic circuit; and a second hydraulic valve coupled to a second port of the hydraulic circuit;

wherein the hydraulic circuit is configured to isolate the first port of the hydraulic circuit from secondary hydraulic pressure supplied to the second port by way of the second hydraulic valve, and further configured to isolate the primary port of the hydraulic circuit from primary hydraulic pressure supplied to the first port by way of the first hydraulic valve; and wherein the primary hydraulic pressure is capable of producing changes in the positions of both the portion of the implement and the first marker in a coordinated manner, and the secondary pressure is capable of producing changes in the position of the first marker independently of the position of the portion of the implement.

2. The apparatus of claim 1, wherein the apparatus is further for controlling a position of a second marker associated with the work vehicle, wherein the hydraulic circuit is further coupled to a third cylinder that governs the position of the second marker.

3. The apparatus of claim 2, wherein the first marker is an outer marker and the second marker is an inner marker.

4. The apparatus of claim 2, wherein the first marker is supported by the implement along a right side of the implement, and the second marker is supported by the implement along a left side of the implement.

5. The apparatus of claim 4, wherein the apparatus is further for controlling positions of third and fourth markers associated with the work vehicle, wherein the hydraulic circuit is further coupled to fourth and fifth cylinders that respectively govern the positions of the third and fourth markers, wherein each of the first and second markers is an outer marker, each of the third and fourth markers is an inner marker, and wherein the third marker is supported by the implement along the right side of the implement, and the fourth marker is supported by the implement along the left side of the implement.

6. The apparatus of claim 2, wherein actuation of the first hydraulic valve is capable of producing changes in the positions of each of the portion of the implement, the first marker, and the second marker in a coordinated manner, and actuation of the second hydraulic valve is capable of producing changes in the positions of the first and second markers independently of the position of the portion of the implement.

7. The apparatus of claim 1, wherein the hydraulic circuit comprises:

third and fourth ports in addition to the first and second ports, wherein the first and third ports are coupled to first and second terminals of the first hydraulic valve, respectively, and wherein the second and fourth ports are coupled to third and fourth terminals of the second hydraulic valve, respectively;

first and second check valves, wherein the first check valve is coupled between the first and second ports and the second check valve is coupled between the third and fourth ports, and wherein the first and second check valves are capable of operating to prevent hydraulic fluid from flowing from the second port to the first port and from the fourth port to the third port, respectively, so that the first and third ports are isolated from the secondary hydraulic pressure supplied by way of the second hydraulic valve to the second and fourth ports.

8. The apparatus of claim 7, wherein each of the first and second check valves is a pilot operated check valve, wherein the first check valve is connected by a first pilot line to the third port and the second check valve is connected by a second pilot line to the first port.

9. The apparatus of claim 8, wherein the hydraulic circuit further comprises third, fourth, fifth and sixth check valves, wherein the third and fourth check valves are coupled in parallel with one another between the first check valve and the second port, wherein the fifth and sixth check valves are coupled in parallel with one another between the second check valve and the fourth port, wherein a first intermediate node exists between the first check valve and each of the third and fourth check valves, and wherein a second intermediate node exists between the second check valve and each of the fifth and sixth check valves, and wherein the third and fourth check valves are capable of operating to prevent hydraulic fluid from flowing from the first port to the second port, and the fifth and sixth check valves are capable of operating to prevent hydraulic fluid from flowing from the third port to the fourth port, so that the second and fourth ports are isolated from the primary hydraulic pressure supplied by way of the first hydraulic valve to the first and third ports.

10. The apparatus of claim 9, wherein each of the fourth and sixth check valves are pilot-to-close check valves, wherein the fourth check valve is connected by a third pilot line to the first port and the sixth check valve is connected by a fourth pilot line to the second port.

11. The apparatus of claim 9, wherein the first cylinder is coupled to one of the first and second intermediate nodes by way of a first additional valve that governs whether the hydraulic fluid is allowed to flow in at least one direction with respect to the first cylinder.

12. The apparatus of claim 11, wherein the first cylinder determines a position of at least one of:

an outer marker, wherein the first cylinder is coupled to the first intermediate node by way of a one-way orifice in addition to the first additional valve; and an inner marker, wherein the first cylinder is coupled to each of the first and second intermediate nodes by way of the first additional valve and a second additional valve, respectively.

13. The apparatus of claim 7, wherein the hydraulic circuit further comprises third and fourth check valves, wherein the third check valve is coupled between the first check valve and the second port and the fourth check valve is coupled between the second check valve and the fourth port, and wherein the third and fourth check valves are capable of operating to prevent hydraulic fluid from flowing from the first port to the second port and from the third port to the fourth port, respectively, so that the second and fourth ports are isolated from the primary hydraulic pressure supplied by way of the first hydraulic valve to the first and third ports.

14. The apparatus of claim 1, wherein each of the first and second hydraulic valves is capable of being set to four settings including a raise setting, a lower setting, a neutral setting and a float setting.

15. The apparatus of claim 1, wherein the portion of the implement is one of a tool bar and the entire implement, wherein the implement is one of at least a portion of a towed vehicle and at least a portion of a primary driving vehicle, and wherein the work vehicle is an agricultural work vehicle.

16. A work vehicle assembly comprising:
- at least one marker that is capable of being raised and lowered at least in part by way of a first hydraulic cylinder;
- another component of the work vehicle assembly that is capable of being raised and lowered at least in part by way of a second hydraulic cylinder;
- a hydraulic circuit having first and second ports and further coupled to the first hydraulic cylinder;
- a hydraulic fluid pressure source;
- a hydraulic fluid reservoir;
- first and second control valves, each of which is coupled between a respective one of the first and second ports and both of the hydraulic fluid pressure source and the hydraulic fluid reservoir, wherein the first control valve additionally is coupled to the second hydraulic cylinder;
- wherein the hydraulic circuit includes means for isolating the first port from secondary hydraulic pressure applied to the second port by way of the second control valve, and for isolating the second port from primary hydraulic pressure applied to the first port by way of the first control valve; and
- wherein the primary hydraulic pressure communicated by way of the first control valve is capable of producing changes in the positions of both the first and second hydraulic cylinders, and the secondary hydraulic pressure communicated by way of the second control valve is capable of producing changes in the position of the first hydraulic cylinder but not the second hydraulic cylinder.

17. The work vehicle assembly of claim 16, wherein the at least one marker includes a plurality of markers and the work vehicle assembly includes a tractor and a towed implement, wherein the component is a toolbar of the towed implement, and wherein the plurality of markers form part of the implement and are supported thereby.

18. A method of controlling positions of at least one portion of an implement and at least one marker on a work vehicle assembly, the method comprising:
- providing primary hydraulic pressure by way of a first control valve to both a first cylinder and a first port of a hydraulic circuit that in turn is coupled to a second cylinder, wherein the first and second cylinders respectively govern the positions of the portion of the implement and the at least one marker, respectively, and wherein the providing of the primary hydraulic fluid adjusts the positions of both the portion of the implement and the at least one marker;
- preventing the primary hydraulic pressure from being communicated, while it is being provided to the first port of the hydraulic circuit, to a second port of the hydraulic circuit;
- providing secondary hydraulic pressure by way of a second control valve to the second port of the hydraulic circuit, wherein the providing of the secondary hydraulic pressure adjusts the position of the at least one marker; and
- preventing the secondary hydraulic pressure from being communicated, while it is being provided to the second port of the hydraulic circuit, to the first port of the hydraulic circuit.

19. The method of claim 18, further comprising,
- allowing hydraulic fluid to flow toward the second control valve and ultimately to a reservoir when neither the first control valve nor the second control valve is actuated.

20. The method of claim 18, wherein the at least one marker includes first and second outer markers and first and second inner markers, wherein the position of the first outer marker is governed by the second cylinder, wherein the positions of the second outer marker, first inner marker and second inner marker are respectively governed by third, fourth, and fifth cylinders, and wherein the hydraulic circuit includes first, second, third and fourth intermediate valves that determine whether the primary and secondary hydraulic pressures can be communicated to the second, third, fourth and fifth cylinders.

* * * * *